June 2, 1970  A. F. PODELL  3,516,025
WIDE BAND HYBRID COUPLER HAVING AN OPEN END TRANSMISSION
LINE SECTION COUPLED TO EACH PART
Filed Dec. 19, 1968  3 Sheets-Sheet 1

INVENTOR.
ALLEN F. PODELL
BY
Kenway, Jenney & Hildreth
ATTORNEYS

United States Patent Office 3,516,025
Patented June 2, 1970

1

3,516,025
WIDE BAND HYBRID COUPLER HAVING AN OPEN END TRANSMISSION LINE SECTION COUPLED TO EACH PART
Allen F. Podell, Cambridge, Mass., assignor to Adams-Russell Co., Inc., Waltham, Mass., a corporation of Massachusetts
Filed Dec. 19, 1968, Ser. No. 785,204
Int. Cl. H01p 5/12
U.S. Cl. 333—11                9 Claims

ABSTRACT OF THE DISCLOSURE

A hybrid coupler employing a ring of quarter wave length transmission lines with four ports as the terminating loads of each transmission line. The bandwidth is extended by placing a quarter wave length open end section of transmission line in series with each terminating load. By selecting transmission lines of appropriate characteristic impedances, acceptable standing wave ratios for bandwidth ratios of 4.5 to 1 may be obtained. In another embodiment, a quarter wave length of open end transmission line is placed in series with each terminating load and a quarter wave length of shorted transmission line is placed in parallel with each terminating load. Appropriate characteristic impedance choices for these transmission lines yield acceptable standing wave ratios for bandwidth ratios of 7 to 1.

FIELD OF THE INVENTION

This invention relates in general to hybrid couplers operating in the radio frequency range and more particularly to an improvement in ring-hybrid couplers providing low loss operation over wide bandwidth ratios.

PRIOR ART

One type of hybrid coupler known in the art is referred to as a ring-hybrid coupler. This device is a four port hybrid formed of two pairs of ports such that the opposite ports of a pair are isolated from one another and each port is closely coupled to the ports of the other pair. Such a prior art device is illustrated in FIG. 1a. With reference to FIG. 1a the hybrid is seen to include three equal length sections of transmission line 11, 12 and 13 with terminating loads 17, 18, 19 and 20 connected across both ends of each of the transmission lines. One conductor of each of the transmission lines is also connected at both ends to ground. A fourth equal length section of transmission line 14 connects the free ends of the transmission lines 11 and 13 with, however, the connections at one end of this fourth transmission line being reversed. Thus the grounded conductor of transmission line 11 is connected through conductor 14″ to the conductor of transmission line 13 which is not connected to ground. Similarly, the non-grounded conductor of transmission line 11 is connected through conductor 14′ of transmission line 14 to the grounded conductor of transmission line 13. The lengths of each of the transmission lines are selected to be ¼ of a wave length for the center frequency of the bandwidth over which the hybrid is to operate.

In the illustration of FIG. 1a, the signal generator is shown as a voltage source 10 in series with its internal resistance 20 to generate an input signal $E_{in}$. With the

2 arrangement no signal will appear across terminating load 18 since this is the opposite and hence isolated port of the pair. The input signal, $E_{in}$, will split, appearing as output signal across terminating loads 17 and 19. The signals across loads 17 and 19 will be in phase with one another and 90° out of phase with the input. If the input signal were applied in place of terminating load 19, rather than in place of terminating load 20, the isolated port would be that represented by terminating load 17 and the power of the input signal would be split, appearing as signals across terminating loads 18 and 20. In this arrangement, however, the signals across loads 18 and 20 would be 180° out of phase, one being 90° ahead in phase of the input signal $E_{in}$ and the other being 90° lagging in phase.

In FIG. 1b there is illustrated the standing wave ratio as a function of frequency where the frequency is expressed in terms of the ratio of the line length $l$ to the wave length $\lambda$. The response illustrated in FIG. 1b is for a transmission line configuration in which each of the terminating loads 17, 18, 19 and 20 has a value of 50 ohms and where the characteristic impedance of each of the transmission lines 11, 12, 13 and 14 is 65 ohms. For these values, in this configuration, a maximum standing wave ratio (VSWR) of 1.18 will be produced over a two to one bandwidth ratio. By varying the characteristic impedance of lines of one pair, relative to the impedances of the lines of the other pair, an unequal power split may be obtained. It should be noted, however, that the impedances of opposite transmission lines should be maintained equal to one another.

In the ring-hybrid illustrated in FIG. 1a, operation over radio frequencies up to 10 gHz. is achievable. Typically such units may have a coupling loss of 3.5 db and an isolation of 25 db.

SUMMARY OF THE INVENTION

Broadly speaking, the present invention provides a hybrid coupling network characterized by a low standing wave ratio (VSWR) over a wide bandwidth ratio. In one embodiment the conventional ring-hybrid is modified by inserting in series with each terminating load a transmission line of length equal to the length of the transmission lines in the ring and of a selected characteristic impedance. This quarter wave length line is left open at the unconnected end. The limitations of bandwidth experienced in the ring-hybrid arise at frequencies below the center frequency because of an inherently inductive characteristic, whereas the limitations in bandwidth at frequencies above the center frequency arise, because at these frequencies, the network appears inherently capacitive. The open quarter wave length sections tend to compensate for this effect since at increased frequencies they appear inductive and at decreased frequencies they appear capacitative. With such a modification a hybrid-ring can be formed, for example, with a maximum VSWR of 1.1 over a bandwidth ratio of 4.65 to 1.

In a second embodiment the network can be further compensated by including in series with each terminating load a quarter wave length open ended section of transmission line and also in shunt with each load a quarter wave length shorted end section of transmission line. If the characteristic impedances of the shorted section and the open section are selected correctly with respect to one another and to the basic transmission line sections of the ring, the bandwidth may be further extended since the shorted end section compensates at the band edges for the capacitive and inductive effects of the open end compensating section. In this second embodiment a maximum VSWR characteristic of 1.10 can be achieved over a bandwidth ratio of 6.34 to 1.

BRIEF DESCRIPTION OF THE DRAWINGS

In the drawings:

FIG. 1b is an illustration in graphical form of the standing wave ratio versus frequency wave characteristic of the network of FIG. 1a;

FIG. 2b is an illustration in graphical form of the standing wave ratio characteristic as a function of frequency of the compensated network of FIG. 2a;

FIG. 3b is an illustration in graphical form of the standing wave ratio characteristic as a function of the frequency of the network of FIG. 3a.

DESCRIPTION OF PREFERRED EMBODIMENTS

Figure 2A:
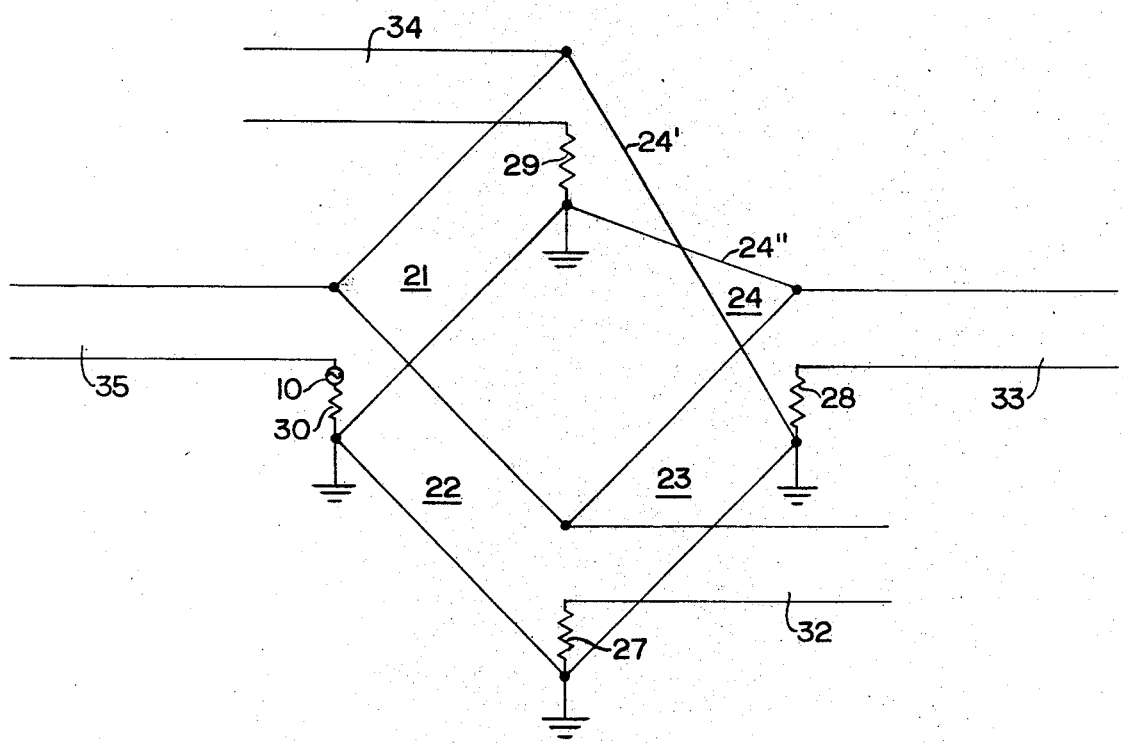
FIG. 2a is an illustration in schematic form of a compensated ring-hybrid network constructed in accordance with the principles of this invention.

In FIG. 2a there is illustrated one embodiment of a hybrid network constructed in accordance with the principles of the invention. The network is formed of four equal length sections of transmission line 21, 22, 23, and 24. Transmission line section 24 has the connections at one end reversed so that conductor 24' connects the grounded side of transmission line 23 with the ungrounded side of transmission line 21, while conductor 24'' connects the grounded side of transmission line 21 with the ungrounded side of transmission line 23. At the end of each of the transmission line sections there is inserted a length of open ended transmission line in series with the terminating load between the two conductors of the basic transmission lines. Thus, at the intersection between transmission lines 22 and 23 transmission line 32 is inserted in series with load 27. Similarly, transmission line 33 is inserted in series with load 28, transmission line 34 is inserted in series with load 29 and transmission line 35 is inserted in series with load 30. The lengths of each of the additional open end sections of transmission line are made equal to the length of the transmission line sections 21, 22, 23, and 24. Thus, the added transmission line sections are each quarter wavelength sections at the mid-frequency of the bandwidth over which the network operates. As in the operation of the basic hybrid-ring network, a driving signal $E_{in}$ applied as a signal at 10 will be isolated from the opposite port of the network and the power of that signal will be divided between loads 27 and 29.

If the characteristic impedance of the open end sections of transmission line is properly selected with respect to the value of the load impedances and of the basic network transmission line sections, the operating bandwidth of the network may be considerably extended. The basis of this calculation is as follows:

$$VSWR = \frac{1+\left|\frac{Z_{in}-R}{Z_{in}+R}\right|}{1-\left|\frac{Z_{in}-R}{Z_{in}+R}\right|}$$

where R is the resistance of the terminating load $$Z_{in} = -jZ_1 \cot \theta + \frac{Za}{2}$$

where $$Z_a = Z_0 \frac{Z_b/Z_0 + j \tan \theta}{1 + j\left(\frac{Z_b}{Z_0}\right) \tan \theta}$$

$$Z_b = \frac{1}{\gamma_2}; \quad \gamma_2 = \frac{1}{Q} - jG_0 \cot \theta$$

$$Q = \frac{1}{G_L} - jZ_1 \cot \theta$$

$$\theta = \frac{2\pi l}{\lambda}$$

and $\lambda$ = wavelength
$l$ = line length
$G_L$ = admittance of load
$G_0$ = characteristic admittance of basic transmission line section
$Z_0$ = characteristic impedance of basic transmission line section
$Z_1$ = characteristic impedance of open end transmission line section Values for specific impedances $Z_0$ of the transmission line sections 21, 22, 23, and 24 and $Z_1$ for the additional compensating open end sections are tabulated below in Table I for specific bandwidth ratios and maximum standing wave ratios.

TABLE I

| VSWR max. | $f_2/f_1$ | $Z_0$ (ohms) | $Z_1$ (ohms) |
|---|---|---|---|
| [1] 1.00 | [2] 4.1 | 70.7 | 14.64 |
| 1.10 | 4.85 | 74.1 | 20.90 |
| 1.36 | 5.81 | 82.3 | 26.6 |

[1] Max. flat.
[2] VSWR=1.32.

NOTE.—R=50 ohms.

Figure 2B:
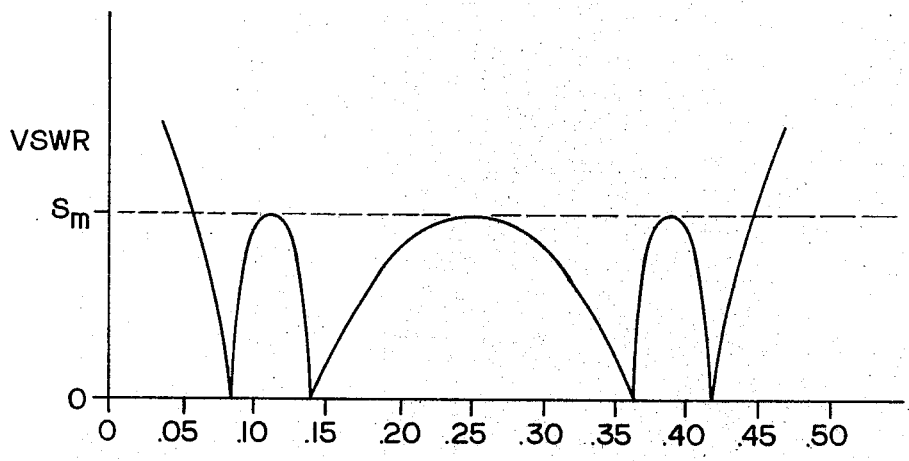

In FIG. 2b there are illustrated the values of standing wave ratio as a function of frequency, where the frequency is expressed in terms of the ratio of the line lengths of the transmission sections to the wavelengths. The value $S_m$ on the vertical ordinate represents the maximum value of the standing wave ratio and, by referring to Table I, the quantitative values of this ratio for specific characteristic impedances may be obtained. For example, in the case of basic transmission line sections having characteristic impedances of 82.3 ohms and open end compensating sections with a characteristic impedance of 26.6 ohms, the maximum standing wave ratio may be limited to 1.36 over a bandwidth ratio of 5.81 to 1.

While Table I assumes that all of the transmission line sections are of equal impedance, an uneven power split may again be produced by varying relative impedances between the pairs of transmission lines.

Figure 1A:
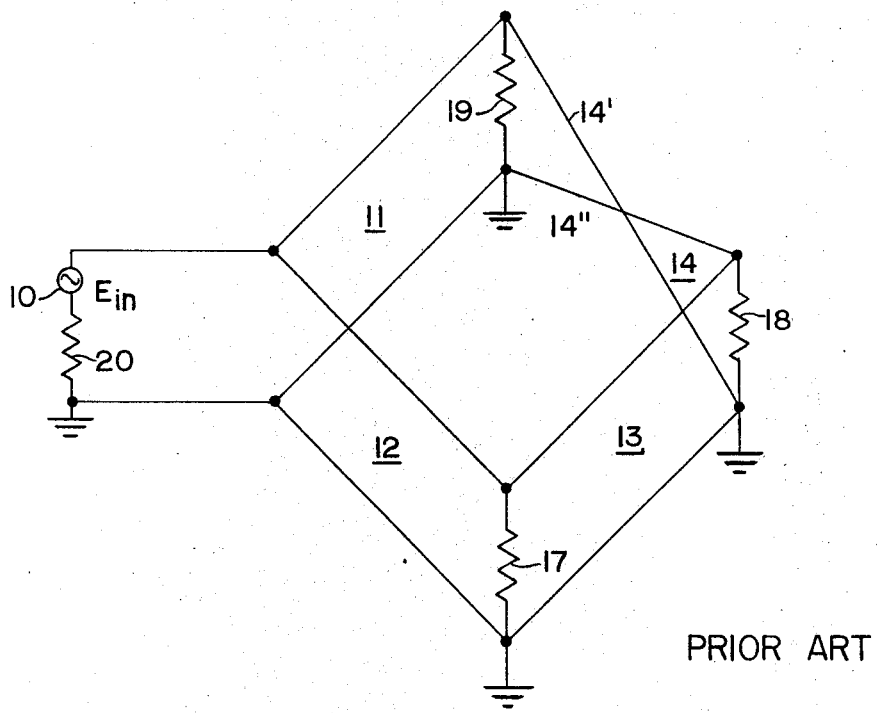
FIG. 1a is an illustration in schematic form of a prior art ring-hybrid network.
Figure 1B:
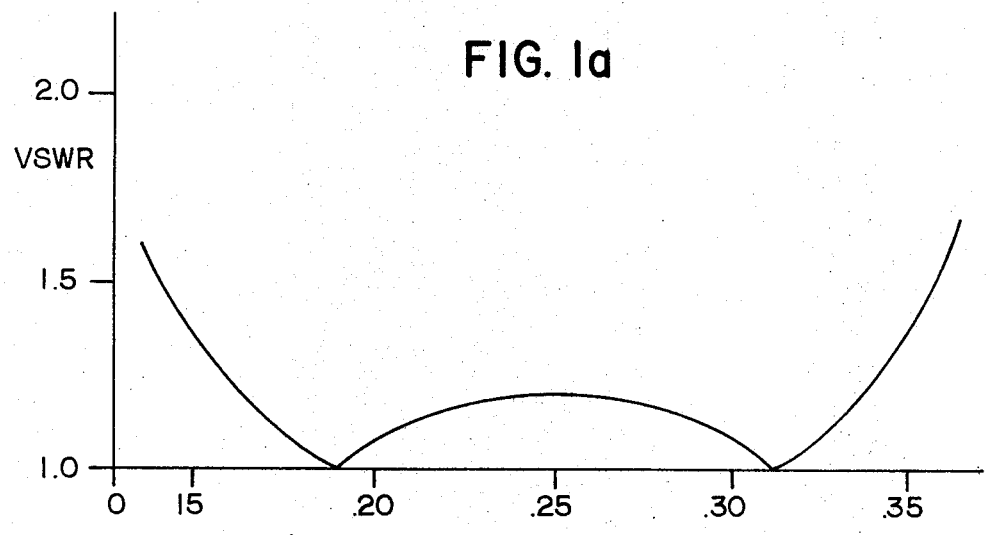
Figure 3A:
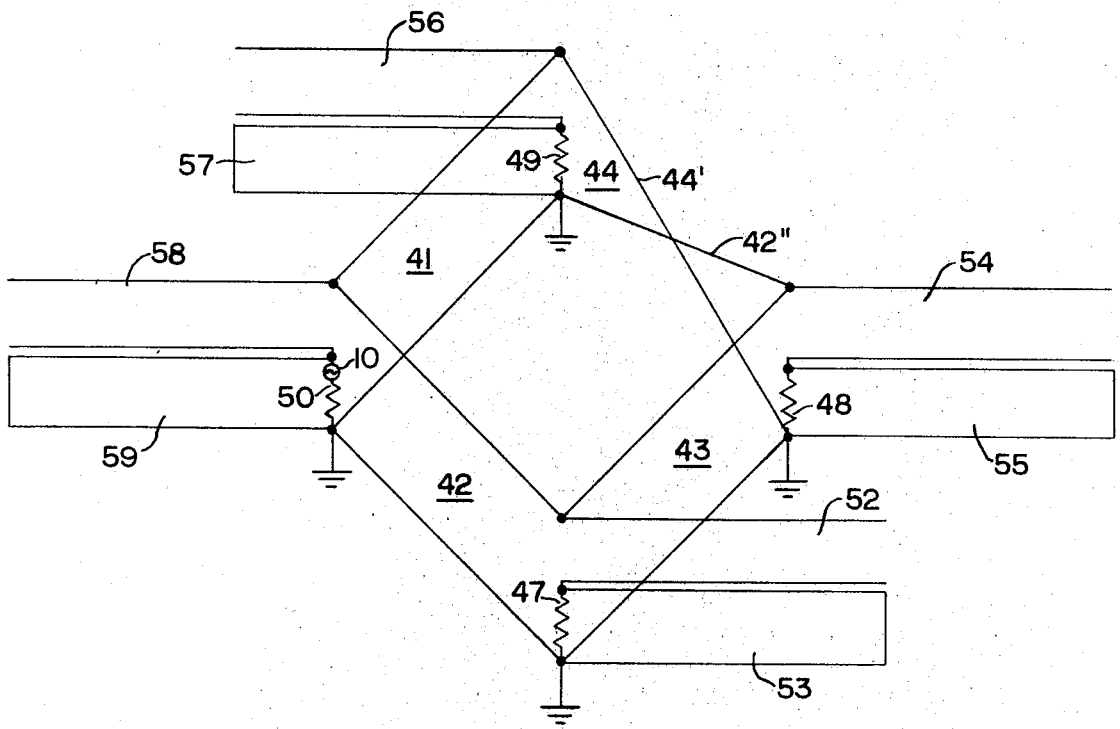
FIG. 3a is an illustration in schematic form of a second embodiment of a compensated ring-hybrid network constructed in accordance with the principles of this invention.

In FIG. 3a there is illustrated a second embodiment of a compensated hybrid-ring network. In this illustration the basic hybrid-ring is substantially identical to that of FIG. 1a and FIG. 2a and consists of four sections, 41, 42, 43 and 44, with the connections of section 44 being reversed at one end. At each intersection an additional compensating line has now been inserted so that, for example, at the intersection between transmission line sections 42 and 43 the conductors are connected by a series combination of an open ended length of transmission line 52 in series with the parallel combination of the load impedance 47 and a shorted section of transmission line 53. The transmission lines 52 and 53 are of equal length with the basic transmission line sections in the ring and again are selected to be a quarter of the wave length at the center frequency of the operating bandwidth. By shunting the load impedance with the shorted section of transmission line and, by selecting the characteristic impedance values of the additional open end section of transmission line 52 and the shorted section 53 properly with respect to the characteristic value of the ring transmission sections, the operating bandwidth for acceptable standing wave ratios may be further extended over those values obtainable with the configuration of the first embodiment illustrated in FIG. 2a.

The basis of calculating the proper values for the relative impedances of these transmission line sections is as follows:

$$VSWR = \frac{1 + \left|\frac{Z_{in}-R}{Z_{in}+R}\right|}{1 - \left|\frac{Z_{in}-R}{Z_{in}+R}\right|}$$

$$Z'_{in} = \frac{1}{\gamma_{in}}; \quad \gamma_{in} = -jG_2 \cot\theta + \gamma_c$$

where $$\gamma_c = \frac{1}{Z_c}; \quad Z_c = -jZ_1 \cot\theta + \frac{Z'_a}{Z}$$

$$Z'_a = Z_0 \frac{\frac{Z'_b}{Z_0} + j\tan\theta}{1 + j\left(\frac{Z'_b}{Z_0}\right)\tan\theta}$$

$$Z'_b = \frac{1}{\gamma'_2}; \quad \gamma'_2 = \frac{1}{Q'} - jG_0 \cot\theta$$

$$Q^1 = jZ_1 \cot\theta + \frac{1}{S}$$

$$S = G_L - jG_2 \cot\theta$$

where $\theta$, $G_L$, $G_0$, $Z_0$ and $Z_1$ are as previously defined and $G_2$ = characteristic admittance of the shorted sections of transmission line $Z_2$ = characteristic impedance of the shorted sections of transmission line.

In Table II there are illustrated typical values of standing wave ratio and operating bandwidth ratio obtainable with particular relative characteristic impedances of the three transmission line sections, the basic section, the open end section and the closed end section, with these characteristics expressed as relative to the value of the load impedance. Also included in that table are values of the impedance, $Z_0$ of the basic section, the impedance $Z_1$ of the open end compensating section and the impedance $Z_2$ of the shorted compensating section for a 50 ohm load.

TABLE II

| VSWR$_{max.}$ | $f_2/f_1$ | $\frac{Z_0}{R}$ | $\frac{Z_1}{R}$ | $\frac{Z_2}{R}$ | R=50 ohms | | |
|---|---|---|---|---|---|---|---|
| | | | | | $Z_0$ (ohms) | $Z_1$ (ohms) | $Z_2$ (ohms) |
| 1.10 | 6.34 | 1.348 | .606 | 2.857 | 67.4 | 30.3 | 142.9 |
| 1.35 | 7.06 | 1.217 | .568 | 2.127 | 60.9 | 28.4 | 106.4 |

Figure 3B:
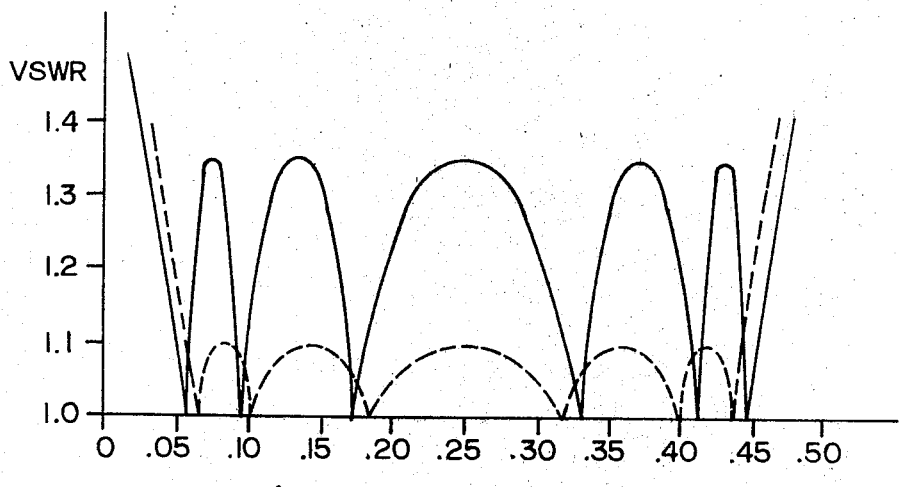

The values of the standing wave ratio as a function of frequency for the conditions tabulated in Table II are illustrated in FIG. 3b, the dotted line representing the curve for the first set of values tabulated, while the solid line represents the curve for the second set of values tabulated. By comparison of FIG. 3b to FIG. 2b, it can be shown that an additional ripple appears in the standing wave ratio characteristic, but that the bandwidth ratio is significantly increased for acceptable values of the standing wave ratio.

From the above two embodiments, it will be understood that the operating bandwidth ratio can be further increased for acceptable values of standing wave ratio by including additional open end and closed end sections, with the open end sections compensating for the limiting characteristic when the standing wave ratio increases at the end of the operating bandwidth because the network appears inherently capacitive above that frequency and inductive below the lower end point of the operating bandwidth, while the closed end compensating transmission line sections will further extend the operating bandwidth when the limiting characteristics are the opposite.

Having described the invention various modifications and improvements will now occur to those skilled in the art and the invention should be construed as limited only by the spirit and scope of the appended claims.

What is claimed is:

1. In a hybrid coupler formed of a ring of four interconnected equal length sections of transmission line, three of said sections being connected in series, said fourth section being twisted to provide a reversed connection at one end thereof, a terminating load being connected across each intersection between sections, said terminating loads forming the ports of said coupler, the improvement comprising:

four additional sections of open end transmission line of specific impedance, each of equal length to said first four sections of transmission line, each of said additional sections being coupled in series with one of said terminating loads across the ends of said first four transmission lines at said intersections, the lengths of said transmission lines being one quarter wave length at the middle of the bandwidth over which the coupler is to operate.

2. A coupler in accordance with claim 1 wherein the relative impedances of the first four sections of transmission line and the four additional sections of transmission line are selected to provide a maximum standing wave ratio less than 1.4 over a frequency bandwidth ratio of greater than 4 to 1.

3. A coupler in accordance with claim 1 wherein the characteristic impedance of each of said first four sections is substantially 70.7 ohms, the characteristic impedance of each of said open end additional sections is substantially 14.6 ohms, and the resistive value of said terminating load is 50 ohms.

4. A coupler in accordance with claim 1 wherein the characteristic impedance of each of said first four transmission line sections is substantially 82.3 ohms, the characteristic impedance of each of said additional open end sections is 26.6 ohms, and the resistive value of said terminating load is 50 ohms.

5. A coupler in accordance with claim 1 and further including four shorted sections of equal length transmission line, each of said four shorted sections being connected across one of said terminating loads.

6. A coupler in accordance with claim 5 wherein the impedances of said first four additional open end sections of transmission line, and said four additional closed end shorted sections are selected to provide a maximum standing wave ratio less than 1.4 over a frequency bandwidth ratio of greater than 6 to 1.

7. A coupler in accordance with claim 5 wherein the ratio of the characteristic impedance of said first four sections of transmission line to said terminating load is substantially 1.35 and wherein the ratio of the characteristic impedance of said additional open end sections of transmission line to said terminating load is substantially .61 and wherein the ratio of the characteristic impedance of said additional four sections of shorted transmission line to the terminating load impedance is substantially equal to 2.8.

8. The coupler in accordance with claim 7 wherein said terminating load has a resistive value of 50 ohms.

9. A coupler in accordance with claim 5 wherein the ratio of the characteristic impedance of said first four sections to the terminating load is substantially 1.22, and wherein the ratio of the characteristic impedance of said additional four open end sections of transmission line to said terminating load is substantially equal to .57 and wherein the ratio of the characteristic impedance of said additional four shorted transmission line sections to said terminating load is substantially equal to 2.13.

References Cited

UNITED STATES PATENTS 2,244,756 6/1941 Alford _____ 333—11 X
2,666,132 1/1954 Barrow _____ 333—11 X HERMAN KARL SAALBACH, Primary Examiner P. L. GENSLER, Assistant Examiner U.S. Cl. X.R.

333—35